US009573674B1

(12) United States Patent
Pingree (10) Patent No.: US 9,573,674 B1
(45) Date of Patent: *Feb. 21, 2017

(54) COLLAPSIBLE LIFT PROPELLERS

(71) Applicant: Amazon Technologies, Inc., Seattle, WA (US)

(72) Inventor: Liam Stewart Cavanaugh Pingree, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,763

(22) Filed: Jun. 30, 2016

Related U.S. Application Data

(63) Continuation of application No. 14/749,299, filed on Jun. 24, 2015, now Pat. No. 9,409,642.

(51) Int. Cl.
*B64C 15/02* (2006.01)
*B64C 11/28* (2006.01)
*B64C 39/02* (2006.01)
*B64C 29/00* (2006.01)

(52) U.S. Cl.
CPC .......... *B64C 11/28* (2013.01); *B64C 29/0025* (2013.01); *B64C 39/024* (2013.01); *B64C 2201/024* (2013.01); *B64C 2201/042* (2013.01); *B64C 2201/088* (2013.01); *B64C 2201/108* (2013.01); *B64C 2201/141* (2013.01)

(58) Field of Classification Search
CPC ........ B64C 11/00; B64C 11/003; B64C 11/16; B64C 11/20; B64C 11/28; B64C 11/46; B64C 39/024; B64C 2201/027; B64C 2201/102; B64C 2201/108; B64C 2201/165

USPC ............................ 244/12.3, 39, 17.23, 17.25
See application file for complete search history.

(56) References Cited

U.S. PATENT DOCUMENTS

| | | | | | |
|---|---|---|---|---|---|
| 2,021,481 | A | * | 11/1935 | Dornier | B64C 11/00 416/142 |
| 5,085,315 | A | * | 2/1992 | Sambell | B64C 27/30 244/17.25 |
| 5,183,384 | A | * | 2/1993 | Trumbly | B63H 1/24 416/142 |
| 8,376,264 | B1 | * | 2/2013 | Hong | B64C 27/26 244/17.23 |
| 9,120,560 | B1 | * | 9/2015 | Armer | B64C 29/0008 |
| 2005/0093507 | A1 | * | 5/2005 | Sliwa | A63H 27/02 320/101 |
| 2011/0042508 | A1 | * | 2/2011 | Bevirt | B64C 15/00 244/12.4 |
| 2016/0001879 | A1 | * | 1/2016 | Johannesson | B64C 27/50 416/142 |

* cited by examiner

*Primary Examiner* — Richard G Davis
(74) *Attorney, Agent, or Firm* — Athorus, PLLC (57) ABSTRACT

Aerial vehicles may be equipped with collapsible lift propellers and thrust propellers. The collapsible lift propellers may include retractable tips that may pivot or rotate from a first orientation substantially co-aligned with a main body of the collapsible lift propellers during ordinary operations and a second orientation substantially transverse to the main body of the collapsible lift propellers when rotation of the collapsible lift propellers is stopped. The collapsible lift propellers may further include biasing elements, e.g., springs for biasing the retractable tips into the second orientation, and mechanical stops for inhibiting the pivoting or rotation of the retractable tips beyond the first orientation.

20 Claims, 7 Drawing Sheets

COLLAPSIBLE LIFT PROPELLERS

CROSS-REFERENCE TO RELATED APPLICATIONS

This application is a continuation of U.S. patent application Ser. No. 14/749,299, filed Jun. 24, 2015, the contents of which are incorporated by reference herein in their entirety.

BACKGROUND

The use of unmanned aerial vehicles such as helicopters having two or more propellers is increasingly common. Such vehicles, which may include quad-copters (e.g., a helicopter having four rotatable propellers), octo-copters (e.g., a helicopter having eight rotatable propellers), or other vertical take-off and landing (or VTOL) aircraft having two or more propellers.

The availability of excess lift is most essential during take-off and landing evolutions of an unmanned aerial vehicle. Precision control of altitude is critical when an unmanned aerial vehicle attempts to take off from or land at a given location, in order to enable the unmanned aerial vehicle to avoid any surrounding objects, structures, animals (e.g., humans) or other unmanned aerial vehicles that may be located nearby when taking off or landing. Accordingly, multi-rotor unmanned aerial vehicles are commonly equipped with greater lift capacity than is commonly utilized during most transiting operations, such that excess lift is available when needed, primarily in take-offs or landings.

In order to conserve onboard electrical power when excess lift is not desired, rotation of one or more propellers of a unmanned aerial vehicle may be shut down when the unmanned aerial vehicle is transiting, or in a thrust mode, such as after the unmanned aerial vehicle has successfully taken off, and recommenced when the unmanned aerial vehicle prepares to land at a given location. For example, an unmanned aerial vehicle may feature sets of thrust propellers and lift propellers. When a maximum amount of lift is desired, both the thrust propellers and the lift propellers may be operated. When the maximum amount of lift is no longer desired, however, the operation of the lift propellers may be stopped, thereby reducing the amount of electrical power consumed during operations. A propeller that is provided on an operating unmanned aerial vehicle and is at rest may create undesirable drag and restrict the stability of the unmanned aerial vehicle during transiting operations.

DETAILED DESCRIPTION

As is set forth in greater detail below, the present disclosure is directed to collapsible lift propellers. More specifically, the systems and methods disclosed herein are directed to a lift propeller having an extension (e.g., a tip) that is pivotably or rotatably mounted to a main body of a propeller blade. The radial extension may be configured to rotate about an axis extending substantially radially from a hub of the propeller blade, between a first position or orientation that is collinear or co-aligned with the main body of the propeller blade and a second position or orientation that is substantially perpendicular to or transverse with the main body.

The lift propeller may include a stop mounted to the main body of the propeller blade for preventing the radial extension from pivoting or rotating beyond the first position or orientation and a biasing element, e.g., a torsion spring, for biasing the radial extension into the second position or orientation. When the lift propeller is spinning under power at an angular velocity consistent with normal operations of an aerial vehicle to which the lift propeller is mounted, the biasing force provided by the biasing element is overcome by airflow over the propeller and the lift generated thereby, and the radial extension is rotated into the first position or orientation. When the powered spinning of the lift propeller is halted, the biasing force causes the radial extension to rotate downward into the second position or orientation, and causes the lift propeller to rotate into alignment with a direction of travel of the aerial vehicle. The lift propeller may further include a counterweight provided to balance the masses or moments of the rotating lift propeller when additional components such as torsion springs or other elements have been incorporated therein.

Figure 1:
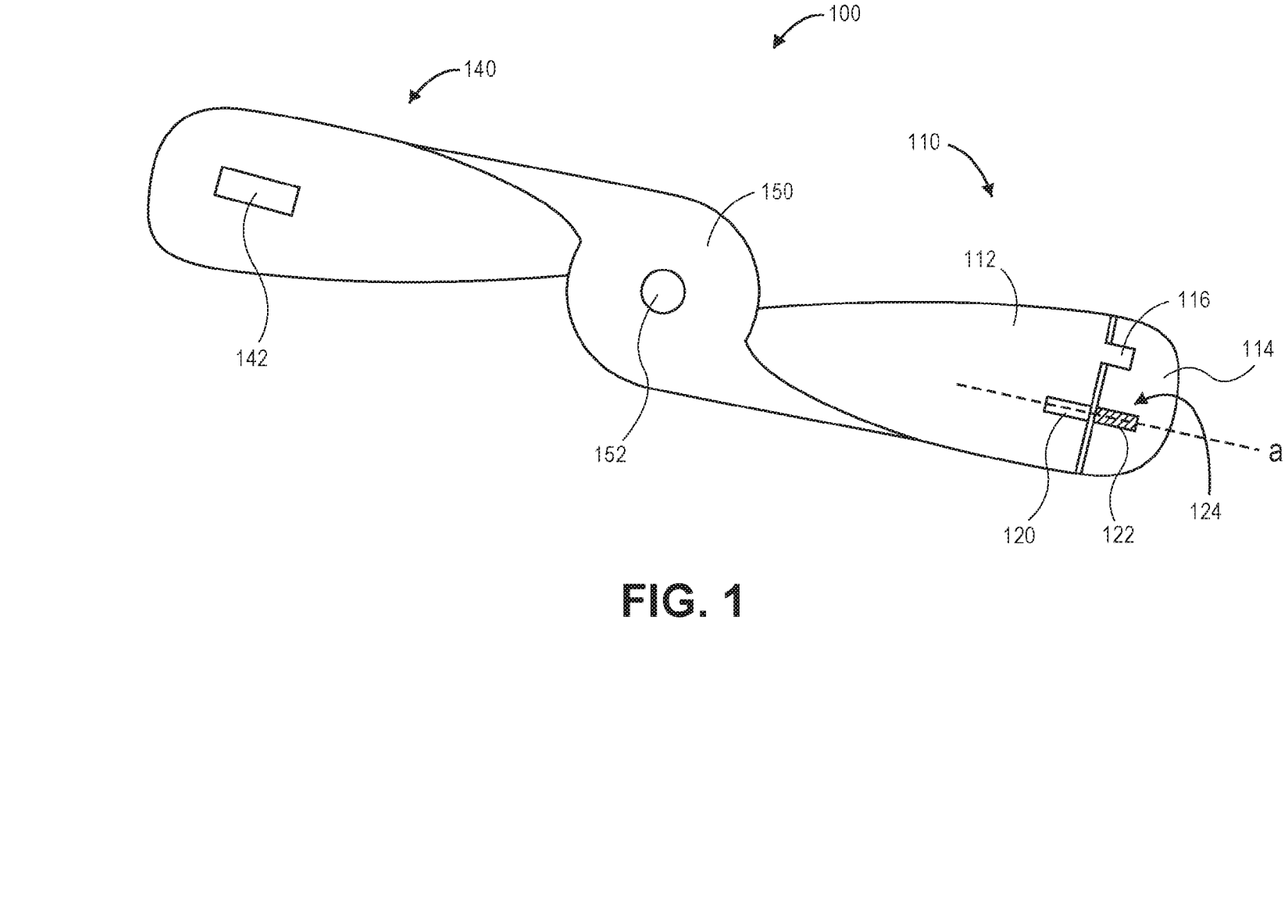
FIG. 1 is a view of aspects of one collapsible lift propeller in accordance with embodiments of the present disclosure.

Referring to FIG. 1, one embodiment of a lift propeller 100 in accordance with embodiments of the present disclosure is shown. The lift propeller 100 includes a collapsible blade 110 and a fixed blade 140 mounted about a hub 150.

The collapsible blade 110 includes a fixed blade root 112 at a distal end and a collapsible blade tip 114 at a proximal end. The collapsible blade tip 114 is pivotably joined to the fixed blade root 112 at a shaft assembly 120 that further includes a torsion spring 122 or other biasing element, and extends into a mounting bore 124 of the collapsible blade tip 114. The fixed blade root 112 includes a mechanical stop 116 that is aligned to come into contact with at least one surface of the collapsible blade tip 114. The mechanical stop 116 may be configured to rest atop the collapsible blade tip 114, or to be received within a recess or indentation (not shown) of the collapsible blade tip 114, when the lift propeller 100 is in operation, and when airflow passing over the collapsible blade tip 114 overcomes the biasing force provided by the torsion spring 122. In the lift propeller 100 of FIG. 1, the collapsible blade tip 114 is in contact with the mechanical stop 116, and is co-aligned with the fixed blade root 112, i.e., in an operational orientation, with surfaces of the collapsible blade tip 114 and the fixed blade root 112 being commonly aligned.

The fixed blade 140 further includes a counterweight 142 provided at a predetermined radial distance from a centroid of rotation of the hub 150. A mass of the counterweight 142 and the predetermined radial distance from the centroid where the counterweight 142 is provided may be selected to account for or otherwise counterbalance effects of forming the various components of the collapsible blade 110, e.g., the shaft assembly 120 or the torsion spring 122, within the lift propeller 110. Such effects may include the addition of masses associated with the shaft assembly 120, the torsion spring 122 or other components, and the radial distances of such masses from the centroid of rotation of the hub 150, as well as flow disruptions during operations that may result from or be caused by the break between the fixed blade root 112 and the collapsible blade tip 114.

The hub 150 further includes a mast opening 152 for receiving a mast or a shaft (not shown) of a transmission associated with a motor provided on an aerial vehicle, e.g., an unmanned aerial vehicle (or drone).

Each of the collapsible blade 110 and the fixed blade 140 defines an airfoil shape for generating lift when the lift propeller 100 is rotated about an axis defined by the hub, e.g., by a mast of a motor transmission provided on an aerial vehicle (not shown). For example, as is shown in FIG. 1, the collapsible blade 110 and the fixed blade 140 each define airfoils having rounded leading edges and pointed trailing edges, which may include upper surfaces or lower surfaces having symmetrical or asymmetrical shapes or cross-sectional areas. The airfoil shapes defined by the collapsible blade 110 and the fixed blade 140, and the angles at which the collapsible blade 110 and the fixed blade 140 are mounted to the hub 150, may be selected based on an amount of lift desired to be provided by the lift propeller 100.

Additionally, the various components of the lift propeller 100 may be formed from any suitable materials that may be selected based on an amount of lift that may be desired in accordance with the present disclosure. In some implementations, aspects of the collapsible blade 110 (e.g., the fixed blade root 112 and/or the collapsible blade tip 114), the fixed blade 140 and/or the hub 150 may be formed from one or more plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. In some implementations, the aspects of the collapsible blade 110 may be formed of one or more lightweight materials including but not limited to carbon fiber, graphite, machined aluminum, titanium, or fiberglass.

Furthermore, in some embodiments, the various components of the lift propeller 110 may be formed by modifying a standard propeller of any type, size, shape or form. For example, a blade tip may be cut from a single blade of a two-blade propeller and reattached to the remaining blade root from which the blade tip was cut by way of a pivotable connection or shaft assembly that may be installed between the blade root and the cut blade tip, and provided with one or more biasing elements. Any additional mass or moment created by the cutting and modification of aspects of a propeller may be addressed by the addition of mass, e.g. in the form of a counterweight 142, to a fixed blade provided on an opposite side of the blade root from which the blade tip was cut.

Additionally, the fixed blade root 112, the collapsible blade tip 114, the fixed blade 140, and/or the hub 150 may be solid or substantially solid, and formed from one or more homogenous or heterogeneous materials. Alternatively, the fixed blade root 112, the collapsible blade tip 114, the fixed blade 140 and/or the hub 150 may be substantially hollow, e.g., with a solid skin defining an airfoil having a hollow cavity therein, with one or more internal supports or structural features for maintaining a shape of the airfoil. For example, the lift propeller 100 or portions thereof may be formed from durable frames of stainless steel, carbon fibers, or other similarly lightweight, rigid materials and reinforced with radially aligned fiber tubes or struts. Utilizing a lift propeller 110 having a substantially hollow cross-section thereby reduces the mass of the lift propeller 110, and enables wiring, cables and other conductors or connectors to be passed therethrough, and in communication with one or more other control systems components or features. The lift propeller 100 or such portions thereof may further be filled with foam or other fillers, strengthened with walls or other supports, and covered with flexible skins for resisting moisture, erosion or any other adverse effects of the elements.

Likewise, the counterweight 142 may be formed from any suitable materials having densities or other attributes (e.g., dimensions, shapes, areas or volumes) that may be selected based on the amount of counterbalancing weight desired, or the radial distance from the centroid of rotation of the hub 150 at which the counterbalancing weight is desired. In some implementations, the counterweight 142 may be formed from a material having a higher density than the fixed blade 140 into which the counterweight 142 is installed or embedded. For example, where the fixed blade 140 is formed from a first plastic, a first wood, a first metal or a first composite material, the counterweight 142 may be formed from a second plastic, a second wood, a second metal or a second composite material having a density that is greater than either the first plastic, the first wood, the first metal or the first composite material.

In some other implementations, a discrete counterweight 142 need not be provided. Instead, the fixed blade 140 may be specifically formed with a mass that is selected to counterbalance the mass of the various components of the collapsible blade 110. For example, where the fixed blade root 112 or the collapsible blade tip 114 is substantially hollow, the fixed blade 140 may be substantially solid, or substantially hollow and with mass in excess of the mass of the collapsible blade 110 and the various components thereof.

The various components of the lift propeller 100 may be reinforced with one or more materials for providing protection against wear that may be experienced during operation, including but not limited to wear caused by rotating or pivoting contact between ends of the fixed blade root 112 and the collapsible blade tip 114. Such ends may be reinforced through lamination or sealing by caps, shoulders, strips or other components (not shown) formed from materials (e.g., fiberglass) that are more durable or friction-resistant than the fixed blade root 112 or the collapsible blade tip 114 itself. Such components may also be lined with or otherwise feature frictionless or low-friction contact materials which reduce or minimize friction that may resist rotation about the shaft assembly 120. Such frictionless or low-friction contact materials may include solid materials such as polytetrafluoroethylene, e.g., Teflon®, liquid substances such as greases or oils, powdered substances such as graphite, or a combination of solid, liquid and/or powdered materials.

The shaft assembly 120 may be any extension to which the collapsible blade tip 114 may be mounted, and which defines an axis a about which the collapsible blade tip 114 may rotate or pivot with respect to the fixed blade root 112. For example, the shaft assembly 120 may be embedded within or otherwise fixed to the fixed blade root 112, and joined to the collapsible blade tip 114, e.g., within the mounting bore 124, in a manner that causes the fixed blade root 112 and the collapsible blade tip 114 to meet at a connection forming a plane perpendicular to the axis a and enables the collapsible blade tip 114 to rotate or pivot freely with respect to the fixed blade root 112. Although the shaft assembly 120 of FIG. 1 is shown in a substantially cylindrical shape, those of ordinary skill in the pertinent arts will recognize that shafts of any shape or form may be utilized to enable the collapsible blade tip 114 to pivot with respect to the fixed blade root 112 in connection with the present disclosure.

The shaft assembly 120 further includes the torsion spring 122, which may be provided in order to bias the collapsible blade tip 114 into a first position or orientation about the shaft assembly 120. The torsion spring 122 may be any type or form of spring provided to resist rotation in response to externally applied torque. Attributes of the torsion spring 122 such as a spring constant may be selected based at least in part on dimensions of the collapsible blade 110, the shaft assembly 120 or the fixed blade 140, materials from which the collapsible blade 110, the shaft assembly 120 or the fixed blade 140 are formed, or operational characteristics of the lift propeller 100 such as maximum operational speeds, angular velocities, air pressures or air velocities that may be anticipated during operation.

In some implementations, the torsion spring 122 may comprise a wire having a cross-sectional area of any size or shape (e.g., round, rectangular or square) that is tightly coiled about the shaft assembly 120, with a first end joined to at least a portion of the fixed blade root 112 or the shaft assembly 120, and a second end joined to at least a portion of the collapsible blade tip 114. The torsion spring 122 may thus expand in length, and contract in coil diameter, in response to bending stresses created by rotation of the collapsible blade tip 114. The torsion spring 122 may be a single torsion spring, a double torsion spring, or any other type or form of torsion spring having any number of coils about the shaft assembly 120. Alternatively, any other biasing elements may be provided in lieu of, or along with, the torsion spring 122. For example, such other biasing elements that may be provided for biasing the collapsible blade tip 114 include, but are not limited to, compression springs, extension springs, leaf springs, constant force springs or like elements.

Additionally, as is also shown in FIG. 1, the fixed blade root 112 further includes a radial extension in the form of the mechanical stop 116 for resisting the rotation of the collapsible blade tip 114 beyond a predetermined angular extent. During rotation, the mechanical stop 116 inhibits the collapsible blade tip 114 from rotating further beyond the position or orientation thereof shown in FIG. 1, and acts to transfer lift force generated by the collapsible blade tip 114 to the fixed blade root 112 and to the lift propeller 100 as a whole. The mechanical stop 116 may have any dimensions with respect to widths or lengths of the fixed blade root 112 or the collapsible blade tip 114, and may, for example, encompass some or all of an upper surface thereof.

Alternatively, although the mechanical stop 116 is provided on an upper surface of the fixed blade root 112, and is adapted to contact an upper surface of the collapsible blade tip 114 to prevent further rotation thereof, those of ordinary skill in the pertinent arts will recognize that other components for restricting rotation of the collapsible blade tip 114 beyond a predetermined angular extent or for transferring lift force may be utilized, including but not limited to mechanical stops provided at other locations of the fixed blade root 112 or the collapsible blade tip 114. For example, a mechanical stop in the form of a radially inward extension may be provided along a lower surface of the collapsible blade tip 114 and aligned to contact a lower surface of the fixed blade root 112 to prevent further rotation of the collapsible blade tip 114 or to transfer lift forces generated by the collapsible blade tip 114 to the fixed blade root 112.

Figure 2:
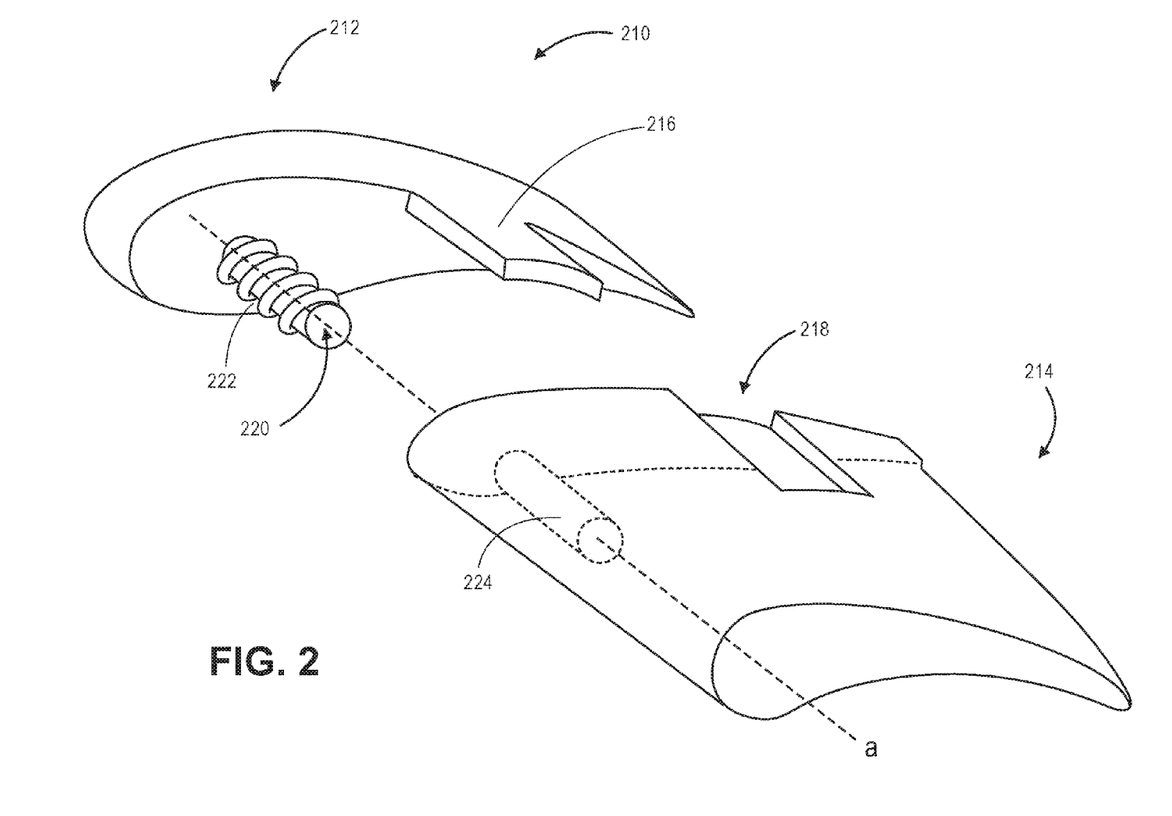
FIG. 2 is a view of aspects of one collapsible lift propeller in accordance with embodiments of the present disclosure.

As is discussed above, the lift propellers of the present disclosure may include collapsible blade tips that are pivotably or rotatably mounted to fixed blade roots. Referring to FIG. 2, aspects of one collapsible lift propeller in accordance with embodiments of the present disclosure are shown. Except where otherwise noted, reference numerals preceded by the number "2" shown in FIG. 2 indicate components or features that are similar to components or features having reference numerals preceded by the number "1" shown in FIG. 1.

As is shown in FIG. 2, a collapsible blade 210 includes a fixed blade root 212 and a collapsible blade tip 214. The fixed blade root 212 further includes a mechanical stop 216 on an upper surface thereof, with the mechanical stop 216 extending radially outward from a hub of the collapsible blade 210 (not shown). The collapsible blade tip 214 is pivotably or rotatably mounted to the fixed blade root 212 by a shaft assembly 220 in a manner that enables the collapsible blade tip 214 to rotate about an axis a, with respect to the fixed blade root 212. The shaft assembly 220 further includes a torsion spring 222 for biasing the collapsible blade tip 214 in a single angular direction with respect to the fixed blade root 212.

In accordance with the present disclosure, the collapsible blade tip 214 is adapted to rotate about the axis a defined by the shaft assembly 220 between at least a first position or orientation in which the collapsible blade tip 214 is substantially vertically oriented with respect to the fixed blade root 212, e.g., substantially perpendicular to or transverse with the fixed blade root 212, and a second position or orientation in which the collapsible blade tip 214 is substantially horizontally oriented, e.g., co-aligned with the fixed blade root 212, and in contact with the mechanical stop 216. When a propeller including the collapsible blade 210 of FIG. 2 is not rotating, the torsion spring 222 biases the collapsible blade tip 214 into the first position or orientation. When the propeller is rotating, however, the biasing force provided by the torsion spring 222 is overcome by the forces generated by the airflow passing over the collapsible blade tip 214, and the collapsible blade tip 214 is caused to pivot or rotate about the axis a into the second position or orientation, e.g., the position or orientation shown in FIG. 2. In the second position or orientation, surfaces of the fixed blade root 212 and the collapsible blade tip 214 are radially co-aligned in a continuous manner, with the mechanical stop 216 of the fixed blade root 212 resting within a recess 218 of the collapsible blade tip 214.

Figure 3A:
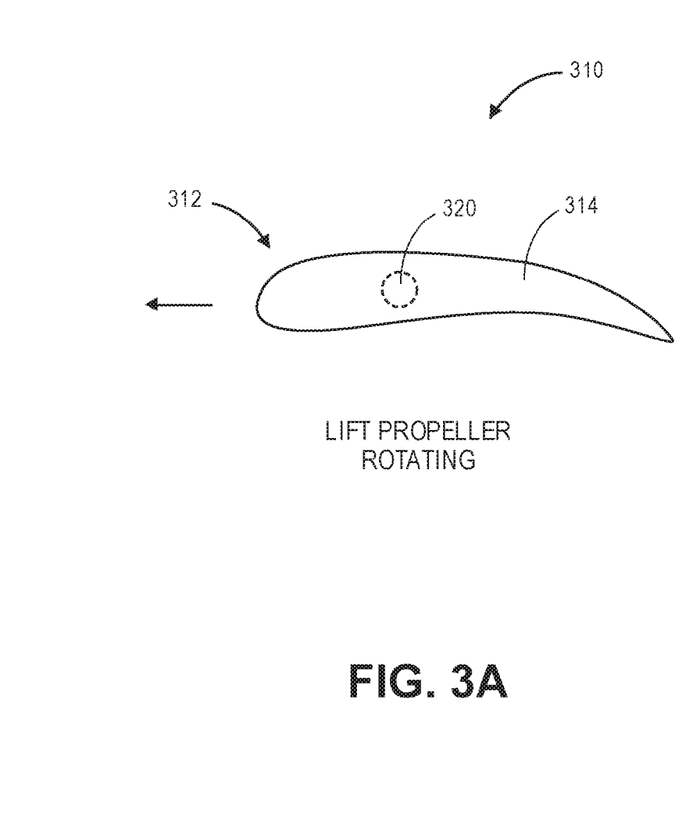
FIGS. 3A and 3B are views of aspects of one collapsible lift propeller in accordance with embodiments of the present disclosure.
Figure 3B:
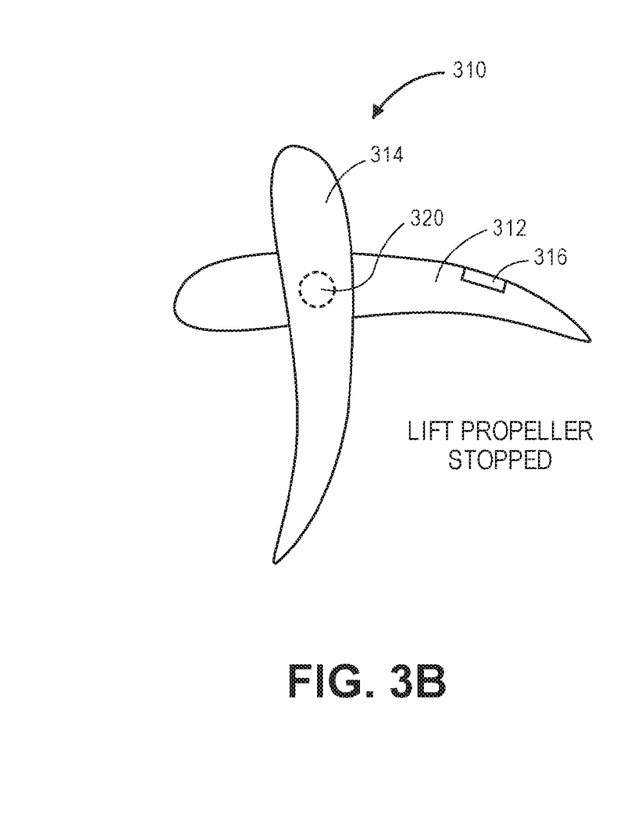

The pivoting or rotation of a collapsible blade tip according to some embodiments of the present disclosure is shown in FIG. 3A and FIG. 3B. Referring to FIG. 3A and FIG. 3B, aspects of one collapsible lift propeller in accordance with embodiments of the present disclosure are shown. Except where otherwise noted, reference numerals preceded by the number "3" shown in FIG. 3A or FIG. 3B indicate components or features that are similar to components or features having reference numerals preceded by the number "2" shown in FIG. 2 or by the number "1" shown in FIG. 1.

Referring to FIGS. 3A and 3B, side views of portions of a collapsible blade 310 is shown. The collapsible blade 310 includes a fixed blade root 312 and a collapsible blade tip 314 joined to the fixed blade root 312 by a pivotable connection 320 including one or more biasing elements (not shown). The collapsible blade 310 is shown in FIGS. 3A and 3B along an axis defined by a radius thereof, and the collapsible blade 310 is mounted to a mast or shaft (not shown) of a motor or other rotatable transmission system.

In FIG. 3A, the collapsible blade 310 is shown as rotating in a given direction, such that airflow passing over and around the collapsible blade 310 overcomes the biasing force provided by the biasing element, thereby causing the collapsible blade tip 314 to be co-aligned with the fixed blade root 312, and to come into contact with at least a portion of the propeller 310. In FIG. 3B, the collapsible blade 310 is shown as not rotating. In the absence of airflow, the biasing force provided by the biasing elements causes the collapsible blade tip to collapse into a substantially vertical orientation shown, e.g., by rotating about the pivotable connection 320, as is shown in FIG. 3B.

When a collapsible blade tip of a lift propeller provided on an aerial vehicle is pivoted or rotated into a substantially vertical position or orientation, such as is shown in FIG. 3B, the lift propeller is ultimately caused to rotate about an axis defined by a mast or shaft (not shown), due to drag generated by the collapsible blade tip. The lift propeller may come to rest, or otherwise be stabilized in a steady-state condition, when the vertically oriented collapsible blade tip is aligned along a direction of travel of the aerial vehicle, thereby causing the collapsible blade tip to function as a rudder or stabilizer of the aerial vehicle during flight.

Referring to FIGS. 4A through 4D, views of aspects of an unmanned aerial vehicle 415 featuring collapsible lift propellers 400-1, 400-2 in accordance with embodiments of the present disclosure are shown. Except where otherwise noted, reference numerals preceded by the number "4" shown in FIG. 4A or FIG. 4B indicate components or features that are similar to components or features having reference numerals preceded by the number "3" shown in FIG. 3A or FIG. 3B, by the number "2" shown in FIG. 2 or by the number "1" shown in FIG. 1.

Figure 4A:
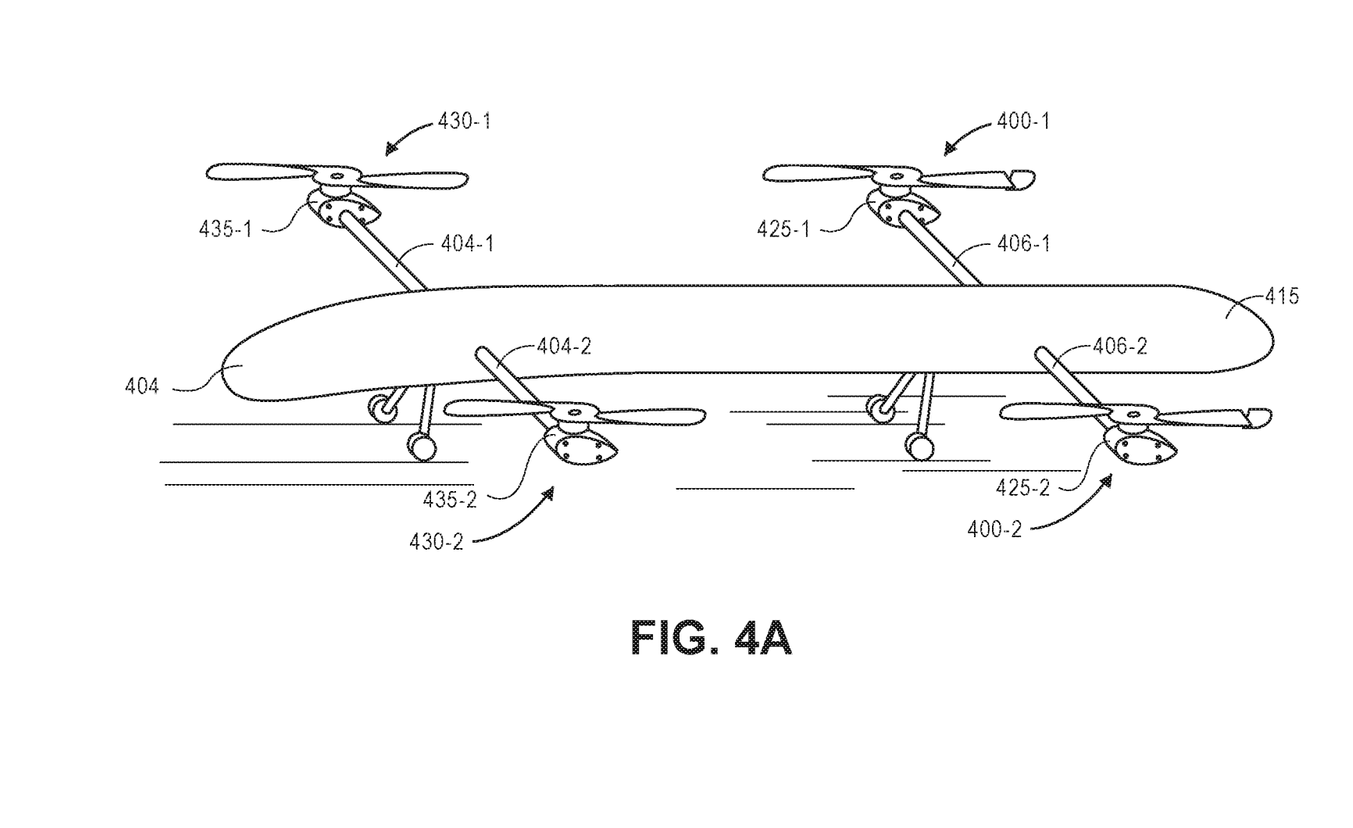
FIGS. 4A through 4D are views of aspects of an unmanned aerial vehicle featuring collapsible lift propellers in accordance with embodiments of the present disclosure.

As is shown in FIG. 4A, the unmanned aerial vehicle 415 includes a frame 402, a first pair of thrust motor arms 404-1, 404-2 and a second pair of lift motor arms 406-1, 406-2. Each of the first pair of the thrust motor arms 404-1, 404-2 is mounted to the frame 402 at a proximal end and includes a thrusting motor 435-1, 435-2 with a thrust propeller 430-1, 430-2 joined thereto at a distal end. Each of the second pair of the lift motor arms 406-1, 406-2 is mounted to the frame 402 at a proximal end and includes a lifting motor 425-1, 425-2 with an embodiment of a lift propeller 400-1, 400-2 in accordance with the present disclosure joined thereto at a distal end. The lift propellers 400-1, 400-2 each include a collapsible blade 410-1, 410-2 and a fixed blade 440-1, 440-2. The collapsible blades 410-1, 410-2 each include a fixed blade root 412-1, 412-2 and a collapsible blade tip 414-1, 414-2, with each of the collapsed blade tips 414-1, 414-2 being configured to pivot or rotate with respect to the fixed blade root 412-1, 412-2 between a substantially horizontal orientation co-aligned with the fixed blade root 412-1, 412-2 and a substantially vertical orientation that is perpendicular to or transverse with the fixed blade root 412-1, 412-2.

The frame 402, the thrust motor arms 404-1, 404-2 and the lift motor arms 406-1, 406-2 may be formed from any suitable materials in accordance with the present disclosure, including but not limited to carbon fiber, aluminum, graphite or others. In the embodiment of the unmanned aerial vehicle 415 of FIG. 4A, each of the thrust motor arms 404-1, 404-2 and the lift motor arms 406-1, 406-2 is approximately the same length with the thrust motor arm 404-1 and the lift motor arm 406-1 aligned substantially parallel to one another, and with the thrust motor arm 404-2 and the lift motor arm 406-2 aligned substantially parallel to one another. In other embodiments, the thrust motor arms 404-1, 404-2 and the lift motor arms 406-1, 406-2 may have different lengths or be arranged at different locations or in different orientations on the frame 402 of the unmanned aerial vehicle 415.

As is also shown in FIG. 4A, thrusting motors 435-1, 435-2 are mounted to each of the thrust motor arms 404-1, 404-2 and lifting motors 425-1, 425-2 are mounted to each of the lift motor arms 406-1, 406-2. Each of the thrusting motors 435-1, 435-2 and each of the lifting motors 425-1, 425-2 may be any form of motor (e.g., electric, gasoline-powered or any other type of motor) capable of generating sufficient rotational speeds of the corresponding propellers 430-1, 430-2, 400-1, 400-2 to lift the unmanned aerial vehicle 415 and any engaged payload, and to aerially transport the engaged payload thereby. Each of the thrusting motors 435-1, 435-2 and each of the lifting motors 425-1, 425-2 may be similar or identical, and feature similar or identical features (e.g., power sources, numbers of poles, whether the motors are synchronous or asynchronous) or operating characteristics (e.g., angular velocities, torques, operating speeds or operating durations). Alternatively, the thrusting motors 435-1, 435-2 and the lifting motors 425-1, 425-2 may have different features or operating characteristics, based on the extent to which the use of such motors or their corresponding propellers 430-1, 430-2, 400-1, 400-2 is desired or required. Each of such thrusting motors 435-1, 435-2 and lifting motors 425-1, 425-2 may be operated individually or in tandem with one another, for any purpose. For example, the thrusting motors 435-1, 435-2 and their respective propellers 430-1, 430-2 may be operated to provide lift in addition to thrust, while the lifting motors 425-1, 425-2 and their respective propellers 400-1, 400-2 may be operated to provide thrust in addition to lift.

Moreover, each of the thrusting motors 435-1, 435-2 and each of the lifting motors 425-1, 425-2 may be mounted at angles such that the propeller masts or shafts of such motors are aligned vertically upward, as is shown in FIG. 4A, or in other configurations not shown in FIG. 4A, including masts or shafts that are aligned vertically downward or at non-vertical angles. Alternatively, in some embodiments, some of the masts or shafts of the motors 404-1, 404-2, 406-1, 406-2 may be aligned vertically upward or at non-vertical angles and some of the masts or shafts of the motors 404-1, 404-2, 406-1, 406-2 may be aligned vertically downward or at other non-vertical angles. Those of ordinary skill in the pertinent arts will recognize that the unmanned aerial vehicles may include any number of the lift propellers of the present disclosure, and any number of thrust propellers, and that such lift propellers or thrust propellers may be aligned and/or operated at any angle in accordance with the present disclosure.

The motors 404-1, 404-2, 406-1, and 406-2 may be encased or enshrouded within one or more motor housings having aerodynamically suitable shapes in order to improve the quality of airflow around the motors 404-1, 404-2, 406-1, and 406-2 while the unmanned aerial vehicle 415 is in motion having a horizontal component. Such housings may be formed of any suitable material, including but not limited to carbon fiber, aluminum, or graphite.

Figure 4B:
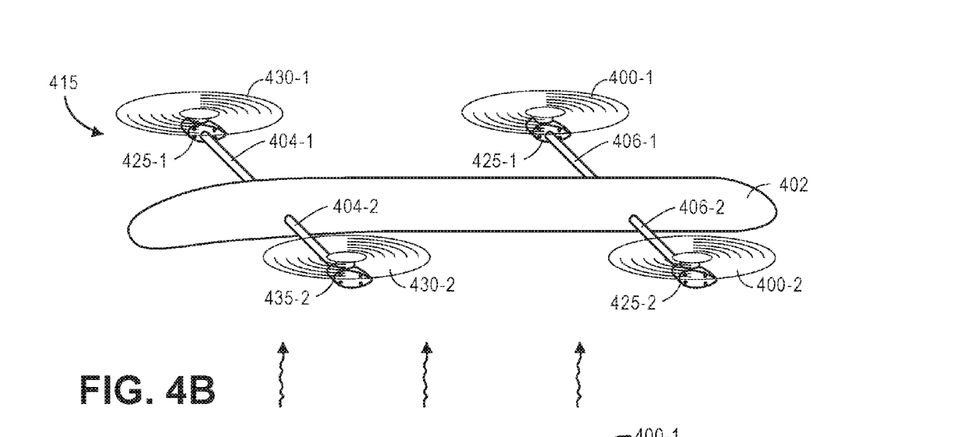

As is discussed above, the lift propellers of the present disclosure may be selectively rotated when additional lifting force is desired or required, and stopped when the additional lifting force is neither desired nor required. Referring to FIG. 4B, the unmanned aerial vehicle 415 is shown as taking off from a given location. As is shown in FIG. 4B, each of the thrusting motors 435-1, 435-2 and each of the lift motors 425-1, 425-2 operates to cause their respective propellers 430-1, 430-2, 400-1, 400-2 to rotate, and to generate lifting forces which cause the unmanned aerial vehicle 415 to take off in a controlled manner.

Figure 4C:
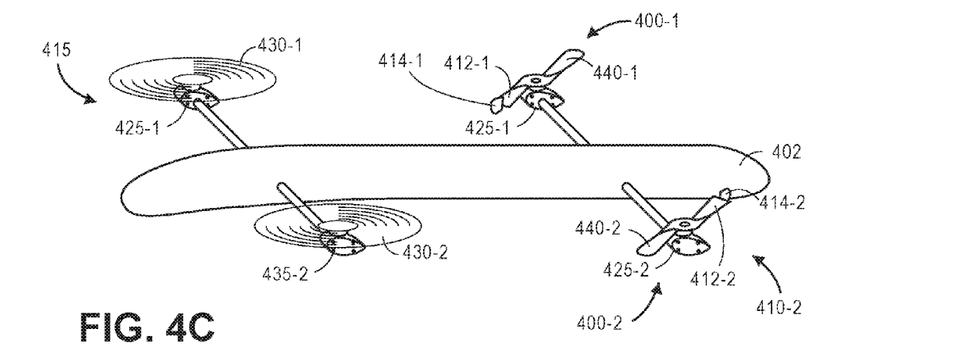

When a desired altitude is reached, e.g., as is determined from outputs of one or more altimeters or other altitude meters, or when the additional lift provided by the lift propellers 400-1, 400-2 is no longer required, the operation of the lifting motors 425-1, 425-2 may be stopped. Referring to FIG. 4C, the unmanned aerial vehicle 415 is shown with the lifting motors 425-1, 425-2 no longer operating to spin the lift propellers 400-1, 400-2 of the present disclosure. Where the airflow over each of the lift propellers 400-1, 400-2 is insufficient to overcome the biasing force or to maintain the collapsible blade tips 414-1, 414-2 in a substantially horizontal orientation, co-aligned with the fixed blade roots 412-1, 412-2, the respective collapsible blade tips 414-1, 414-2 each is caused to pivot or rotate about a radial axis from the substantially horizontal orientation, such as is shown in FIG. 3A, into a substantially vertical orientation, such as is shown in FIG. 3B.

Figure 4D:
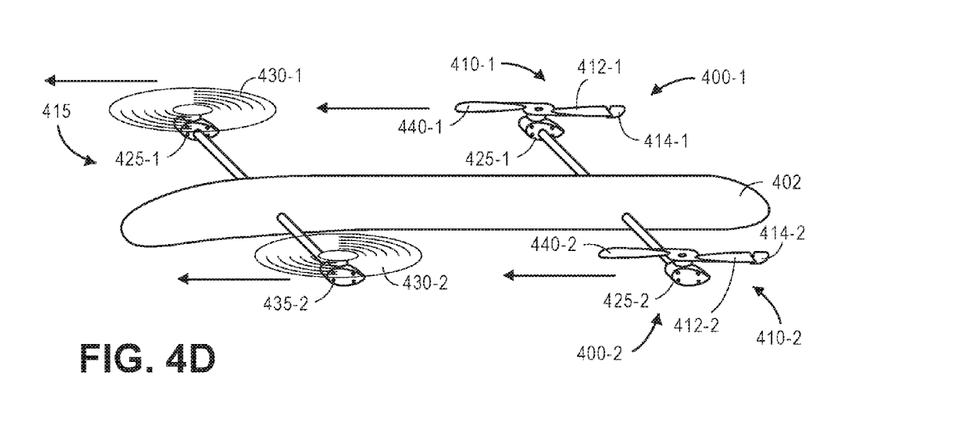

When the collapsible blade tips 414-1, 414-2 of the lift propellers 400-1, 400-2 rotate into a substantially vertical orientation, such as is shown in FIG. 3B, airflow passing over and around the unmanned aerial vehicle 415 during flight causes the lift propellers 400-1, 400-2 to align in a direction of travel of the unmanned aerial vehicle 415, and the substantially vertical collapsible blade tips 414-1, 414-2 to act as stabilizers. Referring to FIG. 4D, the unmanned aerial vehicle 415 is shown engaged in substantially horizontal flight, with the lift propellers 400-1, 400-2 aligned parallel to the frame 402 of the unmanned aerial vehicle 415. The substantially horizontal flight of the unmanned aerial vehicle 415 is thus stabilized by the lift propellers 400-1, 400-2 in general, and the collapsible blade tips 414-1, 414-2 in particular. Subsequently, when the operation of the unmanned aerial vehicle 415 requires additional lift, the operation of the lifting motors 425-1, 425-2 may be reinitiated, thereby causing the lift propellers 400-1, 400-2, and the collapsible blade tips 414-1, 414-2 to pivot or rotate into an operational orientation.

A collapsible blade tip may be mounted to a fixed blade root in any location within a cross-section of a collapsible blade in accordance with the present disclosure. The placement of a pivotable connection or shaft assembly within a collapsible blade may be selected on any basis, including but not limited to one or more dimensions, attributes or operating characteristics of the collapsible blade, or of the pivotable connection or shaft assembly (e.g., the torsion spring or other biasing element provided therein). Referring to FIGS. 5A, 5B, 6A, and 6B, views of aspects of collapsible lift propellers in accordance with embodiments of the present disclosure are shown. Except where otherwise noted, reference numerals preceded by the numbers "5" or "6" shown in FIGS. 5A and 5B or FIGS. 6A and 6B, respectively, indicate components or features that are similar to components or features having reference numerals preceded by the number "4" shown in FIG. 4A or FIG. 4B, by the number "3" shown in FIG. 3A or FIG. 3B, by the number "2" shown in FIG. 2 or by the number "1" shown in FIG. 1.

Figure 5A:
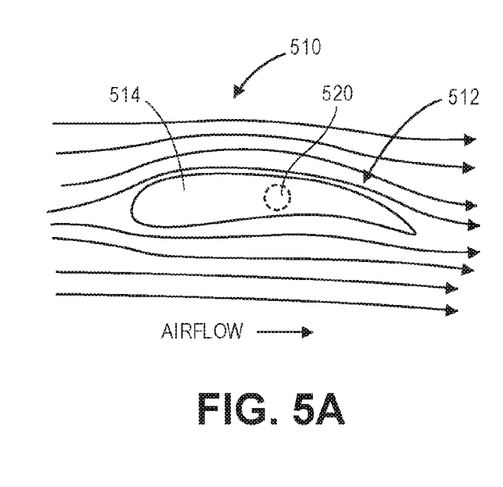
FIGS. 5A and 5B are views of aspects of one collapsible lift propeller in accordance with embodiments of the present disclosure.
Figure 5B:
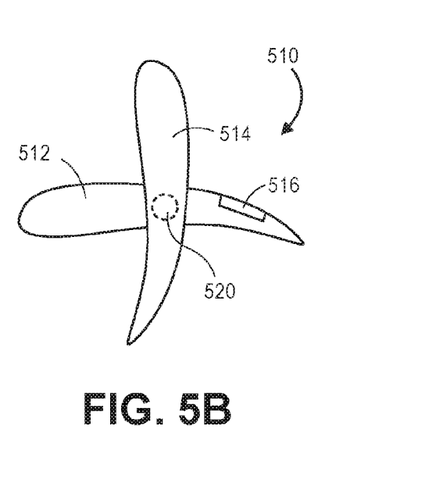

Referring to FIGS. 5A and 5B, side views of portions of a collapsible blade 510 is shown. The collapsible blade 510 includes a fixed blade root 512 and a collapsible blade tip 514 joined to the fixed blade root 512 by a pivotable connection 520 including one or more biasing elements (not shown). As is shown in FIG. 5A, the pivotable connection 520 is provided at or near a centroid of a cross-section of the collapsible blade 510, e.g., approximately halfway across the width of the collapsible blade 510 between a leading edge and a trailing edge thereof. By comparison, referring again to FIG. 3A, the pivotable connection 320 of the collapsible blade 310 was located nearer to the leading edge of the collapsible blade 310. Therefore, when the rotation of the collapsible blade 510 is stopped, and the airflow passing over the collapsible blade tip 514 is insufficient to overcome a biasing force associated with the pivotable connection 520 and cause the collapsible blade tip 514 to remain in the position or orientation shown in FIG. 5A, the collapsible blade tip 514 rotates into a substantially vertical orientation with respect to the substantially horizontal orientation of the fixed blade root 512.

As is shown in FIG. 5B, because the collapsible blade tip 514 is mounted to the fixed blade root 512 via a pivotable connection 520 provided at or near a centroid of a cross-section of the collapsible blade 510, approximately half of the collapsible blade tip 514 extends above the fixed blade root 512 and approximately half of the collapsible blade tip 514 extends below the fixed blade root 512 when the collapsible blade tip 514 is provided in the substantially vertical orientation shown in FIG. 5B.

Figure 6A:
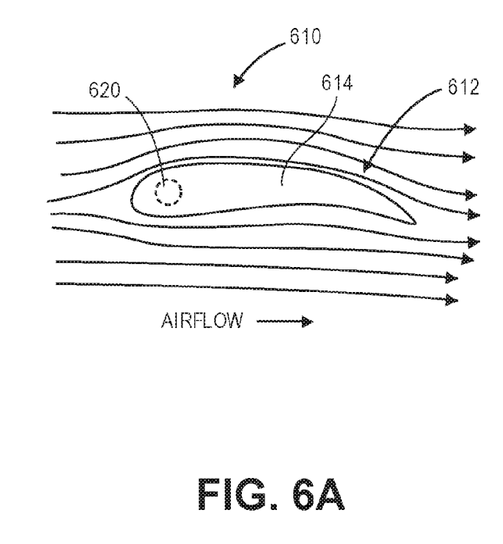
FIGS. 6A and 6B are views of aspects of one collapsible lift propeller in accordance with embodiments of the present disclosure.
Figure 6B:
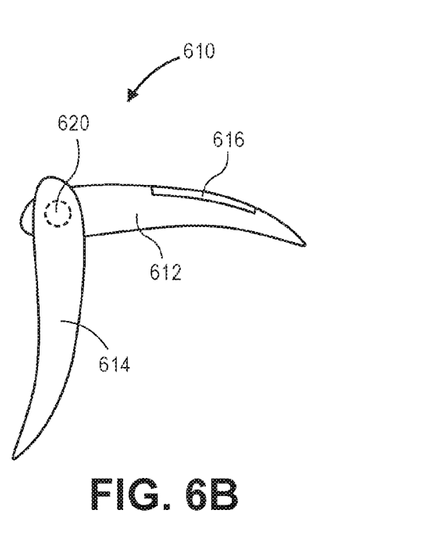

Similarly, referring to FIG. 6A and FIG. 6B, side views of portions of a collapsible blade 610 including a fixed blade root 612 and a collapsible blade tip 614 joined to the fixed blade root 612 by a pivotable connection 620 including one or more biasing elements (not shown). As is shown in FIG. 6A, the pivotable connection 620 is provided very near to a leading edge of the collapsible blade 610, e.g., significantly forward of the centroid of the cross-section of the collapsible blade 610. Therefore, when the rotation of the collapsible blade 610 is stopped, and the airflow passing over the collapsible blade tip 614 is insufficient to overcome a biasing force associated with the pivotable connection 620 and cause the collapsible blade tip 614 to remain in the position or orientation shown in FIG. 6A, the collapsible blade tip 614 rotates into a substantially vertical orientation with respect to the substantially horizontal orientation of the fixed blade root 612. As is shown in FIG. 6B, because the collapsible blade tip 614 is mounted to the fixed blade root 612 via a pivotable connection 620 provided near to the leading edge of the collapsible blade 610, the vast majority of the collapsible blade tip 614 extends below the fixed blade root 612 and insignificant portions of the collapsible blade tip 614 extend above the fixed blade root 612 when the collapsible blade tip 614 is provided in the substantially vertical orientation shown in FIG. 6B.

Figure 7:
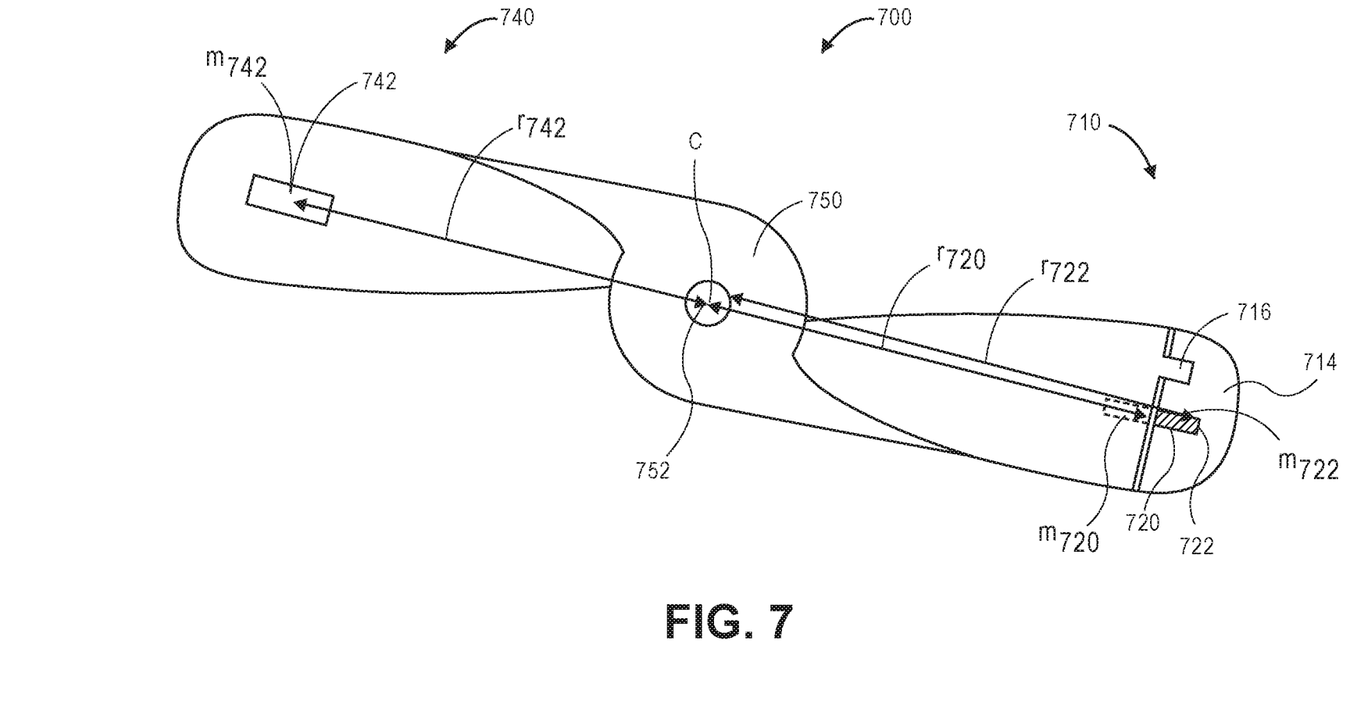
FIG. 7 is a view of aspects of one collapsible lift propeller in accordance with embodiments of the present disclosure.

Adverse operational effects caused by the incorporation of additional components, such as pivotable connections, shaft assemblies, torsion springs or other biasing elements into a collapsible blade of a lift propeller in accordance with the present disclosure may be addressed in whole or in part by installing one or more counterweights into a fixed blade that opposes the collapsible blade into which the additional components were installed. Referring to FIG. 7, one embodiment of a lift propeller 700 in accordance with embodiments of the present disclosure is shown. Except where otherwise noted, reference numerals preceded by the by the number "7" shown in FIG. 7 indicate components or features that are similar to components or features having reference numerals preceded by the number "6" shown in FIG. 6A or FIG. 6B, by the number "5" shown in FIG. 5A or FIG. 5B, by the number "4" shown in FIG. 4A or FIG. 4B, by the number "3" shown in FIG. 3A or FIG. 3B, by the number "2" shown in FIG. 2 or by the number "1" shown in FIG. 1.

As is shown in FIG. 7, the lift propeller 700 includes a collapsible blade 710 and a fixed blade 740 mounted about a hub 750. The collapsible blade 710 includes a fixed blade root 712 at a distal end and a collapsible blade tip 714 at a proximal end. The collapsible blade tip 714 is pivotably joined to the fixed blade root 712 at a shaft assembly 720 that further includes a torsion spring 722 or other biasing element. The fixed blade root 712 includes a mechanical stop 716 that is aligned to come into contact with at least one surface of the collapsible blade tip 714. In the lift propeller 700 of FIG. 7, the collapsible blade tip 714 is in contact with the mechanical stop 716, and is co-aligned with the fixed blade root 712, i.e., in an operational position or orientation, with surfaces of the collapsible blade tip 714 and the fixed blade root 112 being commonly aligned.

The lift propellers of the present disclosure may include one or more features for compensating for or addressing adverse effects associated with including the shaft assembly 720 or the torsion spring 722 on the lift propeller 700. As is shown in FIG. 7, the fixed blade 740 further includes a counterweight 742 having a mass $m_{742}$ embedded therein, with a centroid of the mass $m_{742}$ at a distance of $r_{742}$ from a center C of rotation of the lift propeller 700, viz., a radial distance to the fixed blade 740 from a center of a mast opening 752 provided within the hub 750. As is also shown in FIG. 7, the shaft assembly 720 has a mass of $m_{720}$ and is provided within the collapsible blade 710 with a centroid of the mass $m_{720}$ located at a distance of $r_{720}$ from the center C, while the torsion spring 722 has a mass of $m_{722}$ and is also provided within the collapsible blade 710 with a centroid of the mass $m_{722}$ located at a distance of $r_{722}$ from the center C.

In accordance with the present disclosure, the counterweight 742 may be formed from predetermined materials and placed in a selected location on the fixed blade 740 to account for any first-order or second-order (e.g., major or minor) effects encountered during operation of the lift propeller 700 due to the incorporation of the shaft assembly 720 or the torsion spring 722 therein. In some embodiments, a difference in mass between the fixed blade 740 and the collapsible blade 710 may result from the incorporation of the shaft assembly 720 and the torsion spring 722, provided at the respective distances $r_{720}$, $r_{722}$ from the center C. For example, if either the shaft assembly 720 or the torsion spring 722 is formed from materials having densities that are greater than the materials from which the collapsible blade 710 or the fixed blade 740 are formed, the addition of the shaft assembly 720 and the torsion spring 722 to the lift propeller 700 will result in the collapsible blade 710 having a greater mass than the fixed blade 740, which may lead to wobbling or uneven rotation of the lift propeller 700 during operation. The counterweight 742 may be provided at the distance $r_{742}$ from the center C to counteract the wobbling or the uneven rotation. One or more counterweights, such as the counterweight 742, may also be provided in order to compensate for effects of a break or discontinuity between the fixed blade root 712 and the compressible blade tip 714 in the collapsible blade 710 during operation.

The materials and the selected location of the counterweight 742 may be chosen for the specific purpose of counterbalancing moment generated by the rotation of the shaft assembly 720 and the torsion spring 722 about the center C, where the mass of the collapsible blade 710 exceeds the mass of the fixed blade 740 based on the addition of the shaft assembly 720 and the torsion spring 722. For example, where the fixed blade 710 and/or the collapsible blade 740 are formed from a plastic material, the counterweight 742 may be formed from not only plastic materials but also woods, metals, or composites (e.g., carbon fiber, graphite, machined aluminum, titanium or fiberglass) having densities that are greater than the density of the plastic material from which the fixed blade 710 and/or the collapsible blade 740 are formed. The mass $m_{742}$, the distance $r_{742}$ or other factors such as the materials from which the counterweight 742 is formed may be selected in order to minimize a difference in moment, such that a sum of the products of the masses added to the fixed blade 740 and the distances to centroids of such masses (e.g., a product of the mass $m_{742}$ of the counterweight 742 and a distance $r_{742}$ to a centroid of the mass $m_{742}$) and a sum of the products of the masses added to the collapsible blade 710 (e.g., a sum of the product of the mass $m_{720}$ of the shaft assembly 720 and a distance $r_{720}$ to a centroid of the mass $m_{720}$, and a product of the mass $m_{722}$ of the torsion spring 722 and a distance $r_{722}$ to a centroid of the mass $m_{722}$) are substantially equal.

By accounting for the difference in mass between the fixed blade 740 and the collapsible blade 710, or the presence of a break or other discontinuity on the collapsible blade 710, any wobbling or uneven rotation of the lift propeller 700, any damage that may result to the lift propeller 700 or any other adverse impacts that may be encountered during flying operations of an aerial vehicle (not shown) to which the lift propeller 700 is mounted may be reduced or avoided.

Alternatively, where the shaft assembly 720 and the torsion spring 722 are formed from materials having densities that are less than the densities of the materials from which the collapsible blade 710 is formed, or where the mass of the portions of the collapsible blade 710 that are removed in order to accommodate either the shaft assembly 720 or the torsion spring is less than the masses $m_{720}$, $m_{722}$ of the shaft assembly 720 and the torsion spring 722, the counterweight 742 may comprise one or more voids, cavities, openings or other mass reductions in the fixed blade 740. Likewise, any difference in mass between the collapsible blade 710 and the fixed blade 740 caused by the incorporation of the shaft assembly 720 and the torsion spring 722 to the collapsible blade 710 may also be addressed through the reduction of mass on the collapsible blade 710, e.g., by the incorporation of one or more voids, cavities or openings therein.

Those of ordinary skill in the pertinent art will recognize that the masses of the collapsible blade 710 and the fixed blade 740 may be matched in any manner to account for the incorporation of the shaft assembly 720 and the torsion spring 722 into the collapsible blade 710, such as by adding mass to, or removing mass from, either the collapsible blade 710 or the fixed blade 740.

The lift propellers of the present disclosure may be utilized to control the lift that is made available to an aerial vehicle, e.g., a manned aerial vehicle or an unmanned aerial vehicle such as a drone, during normal operations. For example, in some embodiments, an aerial vehicle may include a first motor and a second motor mounted to a frame, with a first lifting propeller of the present disclosure coupled to the first motor and a second thrust propeller coupled to the second motor. When the aerial vehicle is on the ground or otherwise not flying, operation of the first motor and the second motor may be initiated to cause the rotation of the first lift propeller and the second thrust propeller. As the first lift propeller of the present disclosure is rotating, a collapsible blade tip may be substantially co-aligned with a fixed blade root to which the collapsible blade tip is pivotably joined. When lift provided by the first lift propeller is no longer required, the first motor may be shut down, thereby causing the first lift propeller to slow, and the collapsible blade tip to be biased into a substantially transverse orientation with respect to the fixed blade root. The orientation of the collapsible blade tip causes the first lift propeller to rotate to a final, steady-state position in which the collapsible blade tip acts as a vertical stabilizer, aligned with a direction of travel of the aerial vehicle, until lift from the first lift propeller is subsequently desired.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the use of unmanned aerial vehicles to deliver payloads from warehouses or other like facilities to customers, those of ordinary skill in the pertinent arts will recognize that uses of one or more of the lift propellers disclosed herein are not so limited, and may be utilized in connection with any type or form of aerial vehicle (e.g., manned or unmanned) for which lift forces are desired on a temporary basis, or for less than an entire duration of flight or related operations.

Moreover, although some of the embodiments disclosed herein depict the use of lift propellers having two blades, e.g., a single fixed blade and a single collapsible blade, such as is shown in FIG. 1, the systems and methods of the present disclosure are likewise not so limited. Rather, the systems and methods of the present disclosure may be utilized in connection with lift propellers having any number of blades, and any portion of such blades may be fixed or collapsible in nature. Moreover, references to blades as "fixed blades" herein shall be understood as meaning that such blades do not include collapsible blade tips, or tips or extensions that may rotate with respect to an axis defined by a blade root of such blades, or align substantially vertically with respect to a substantially horizontal blade root. The term "fixed blade" shall not understood as precluding such blades from having one or more other adjustable features for aligning themselves with respect to masts or shafts of motors or other transmission systems.

Likewise, a determination that additional lift provided by one or more lift propellers of the present disclosure is no longer required may be made on any basis. For example, when an aerial vehicle includes one of the lift propellers disclosed herein, the rotation of the lift propeller may be stopped (e.g., a motor coupled to the lift propeller may be shut off) when the aerial vehicle reaches a threshold altitude as determined according to an altimeter (e.g., a pressure altimeter, a sonic altimeter, a radar altimeter) or any other altitude meter provided on the aerial vehicle, or any other altitude-sensing system (e.g., global positioning satellite systems) in accordance with the present disclosure. The manner in which an altitude may be determined, or the reasons for which the rotation of one or more lift propellers may be stopped, is not limited by any of the embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
a frame;
a motor mounted to the frame;
a propeller coupled to the motor;
wherein the propeller comprises a fixed blade and a collapsible blade mounted to a hub coupled to the motor, and
wherein the collapsible blade comprises a fixed blade root and a collapsible blade tip pivotably mounted to the fixed blade root.

2. The unmanned aerial vehicle of claim 1,
wherein the motor is configured for operation during a lifting of the unmanned aerial vehicle, and
wherein the motor is configured to be stopped during a thrusting of the unmanned aerial vehicle.

3. The unmanned aerial vehicle of claim 1,
wherein the collapsible blade tip is pivotably mounted to the fixed blade root at a spring-biased connection,
wherein the collapsible blade tip is adapted to rotate about an axis defined by the spring-biased connection between a first orientation that is co-aligned with the fixed blade root and a second orientation that is substantially perpendicular to the fixed blade root, and
wherein the fixed blade root further comprises a mechanical stop aligned to contact at least one surface of the collapsible blade tip when the collapsible blade tip is in the first orientation and to inhibit the collapsible blade tip from rotating beyond the first orientation.

4. The unmanned aerial vehicle of claim 3,
wherein the spring-biased connection comprises a torsion spring aligned to bias the collapsible blade tip into the second orientation.

5. The unmanned aerial vehicle of claim 1,
wherein the unmanned aerial vehicle is a multi-rotor vehicle including two motors mounted to the frame,
wherein each of the two motors is coupled to one of two propellers, and
wherein each of the two propellers comprises the fixed blade and the collapsible blade.

6. A propeller comprising:
a collapsible blade mounted about a hub,
wherein the collapsible blade comprises a fixed blade root at a proximal end of the collapsible blade and a collapsible blade tip at a distal end of the collapsible blade,
wherein the collapsible blade tip is pivotably joined to the fixed blade root.

7. The propeller of claim 6,
wherein the collapsible blade tip is configured to pivot between a first orientation co-aligned with the fixed blade root and a second orientation substantially perpendicular to the fixed blade root.

8. The propeller of claim 7,
wherein the collapsible blade further comprises a shaft assembly having a shaft pivotably joining the collapsible blade tip to the fixed blade root, and
wherein the collapsible blade tip is configured to pivot between the first orientation and the second orientation about an axis defined by the shaft.

9. The propeller of claim 8,
wherein the shaft assembly further comprises a biasing element configured to bias the collapsible blade tip into the second orientation.

10. The propeller of claim 9,
wherein the biasing element has a spring constant selected based at least in part on an operational speed of the propeller, an anticipated air pressure on the collapsible blade tip when the propeller is at the operational speed or an anticipated air velocity passing over the collapsible blade tip when the propeller is at the operational speed.

11. The propeller of claim 8, further comprising a fixed blade mounted opposite the collapsible blade about the hub,
wherein the fixed blade further comprises a counterweight having a first mass provided at a first distance from a center of the hub.

12. The propeller of claim 11,
wherein at least one of the first mass or the first distance is selected based at least in part on a second mass of the shaft, a second distance of a centroid of the second mass from the center of the hub, a third mass of the biasing element or a third distance of a centroid of the biasing element from the center of the hub.

13. The propeller of claim 12,
wherein a first product of the first distance and the first mass is substantially equal to a sum of a second product of the second distance and the second mass and a third product of the third distance and the third mass.

14. The propeller of claim 8, wherein the collapsible blade tip is pivotably joined to the fixed blade root at a first distance from a center of the hub, and
wherein the shaft is aligned along an axis corresponding to a centroid of a cross-section of the collapsible blade at the first distance from the center of the hub.

15. The propeller of claim 7, wherein the fixed blade root further comprises a stop extending radially outward from the hub, and
wherein the stop is configured to contact at least one surface of the collapsible blade tip when the collapsible blade tip is in the first orientation.

16. The propeller of claim 15, wherein the collapsible blade tip further comprises a recess provided on the at least one surface, and
wherein the recess is aligned to receive the stop when the collapsible blade tip is in the first orientation.

17. The propeller of claim 6, wherein the hub comprises a mast opening adapted for mounting to a rotatable mast of a motor.

18. An aerial vehicle having a plurality of propellers, wherein at least one of the plurality of propellers is the propeller of claim 6.

19. A method to operate an aerial vehicle comprising:
initiating an operation of a motor having a propeller coupled thereto;
determining that force from the propeller is not desired; and
stopping the operation of the motor,
wherein the propeller comprises a shaft assembly, a fixed blade and a collapsible blade having a fixed blade root and a collapsible blade tip pivotably mounted to the fixed blade root by the shaft assembly,
wherein the collapsible blade tip is aligned to pivot about an axis defined by the shaft assembly between a first orientation substantially co-aligned with the fixed blade root and a second orientation substantially transverse to the fixed blade root,
wherein the shaft assembly further includes a torsion spring biasing the collapsible blade tip into the second position, and
wherein airflow over at least the collapsible blade tip during the operation of the motor urges the collapsible blade tip into the first position.

20. The method of claim 19, wherein determining that the force from the propeller is not desired further comprises:
  determining that an altitude of the aerial vehicle exceeds a predetermined threshold; and
  stopping the operation of the motor.

* * * * *